June 2, 1959

G. E. MONFORE 2,889,528

STANDARDIZING STRAIN GAGE

Filed Feb. 27, 1957

GERVAISE E. MONFORE
Inventor

Attorney 2,889,528

STANDARDIZING STRAIN GAGE

Gervaise E. Monfore, Mount Prospect, Ill., assignor to the United States of America as represented by the Secretary of the Interior Application February 27, 1957, Serial No. 642,918

7 Claims. (Cl. 338—6)

(Granted under Title 35, U.S. Code (1952), sec. 266)

This invention herein described and claimed, may be manufactured and used by or for the Government of the United States of America, for governmental purposes without the payment of any royalties thereon or therefor.

This invention relates to an improved strain gage suitable for the measurement of strains or small movement over long periods of time.

Many solid materials which are subjected to moderate loads over long periods of time exhibit what is commonly called "creep." Although the load remains constant, the strain in the solid continues to increase. Creep, which may be defined as the continuous deformation of a solid under steady load, is exceedingly important in the behavior of engineering materials and structures.

Measurement of creep, however, is very difficult. The major source of difficulty is the instability of the gage used to measure the strains. A gage which is perfectly satisfactory for measuring small strains during the short time required for an ordinary test or laboratory experiment may prove worthless when the measurements must be taken over a period of days or weeks. Many of the resistance wire strain gages show "drift" characteristics. That is, the resistance of the gage itself under zero strain changes with time, and hence is of no value for measurements to be taken over a long time period. Drift may be caused by changes in the materials used in bonding the strain gage to the object under study, by changes in the crystallographic structure of the wire, and by changes in lead wire and bridge circuits. From the foregoing, it is apparent that a strain gage in order to be useful in measuring creep properties of solids must be very stable, or must be capable of being corrected to eliminate the errors due to drift characteristics.

Precise measurement of strains which occur in structural members or materials over a long period of time are necessary for a more accurate knowledge of their long term behavior. Such improved knowledge will provide a basis for better and more economical structural designs.

It is a principal object of this invention to provide an improved strain gage which is suitable for the measurement of small displacements occurring over long periods of time.

Another object of this invention is to incorporate into the gage a self-contained standard, so that all measurements are based on the length of the standard.

Another object is to provide means whereby readings may be taken in either a standardizing position or in a measuring position.

A further object of this invention is to provide a gage in which strain measurements are referred to a standard, so that the drift characteristics of the strain sensitive element, of the lead wires, or of the bridge circuit, may be compensated for in strain measurements taken over a long period of time.

A still further object of the invention is to provide a gage which will accurately measure strains by comparing displacements to a self-contained, highly stable length standard.

A still further object is to provide a standardizing gage which may be embedded in a solid.

Other objects and advantages will be more apparent to those skilled in the art from the following description of the accompanying drawing in which.

Figure 1:
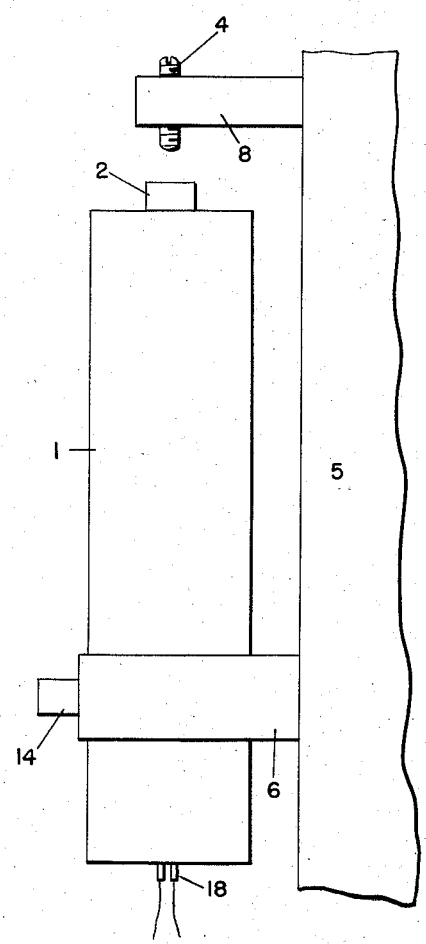
Fig. 1 is a view in elevation showing one form of the device attached to a rock core.

In the particular embodiment shown in the drawings, an elongated first cylindrical member, constituting a metal tube 1 is detachably mounted in a metal holder 6 and is kept from relative motion as by a set screw (not shown). Holder 6 is rigidly fastened to an element subject to strain, such as rock core 5, by means of an insert, such as stud bolt 7, which is cemented in a hole drilled in said core. Bolt 4, which serves as a gage stop is threaded into an opening in metal holder 8. The latter is mounted on core 5 by means of an insert, such as stud bolt 9, in a manner similar to holder 6.

A second cylindrical member constituting piston 2 is slidably mounted in cylinder 1, which has rings 11 and 15 mounted on its inner face. Piston 2 has rings 12 and 13 fastened thereto, and as is apparent from the drawing, these rings form the piston bearing surfaces. Compression spring 10 located between rings 12 and 11, on the piston and cylinder, respectively, keep the piston in a retracted position, ring 13 on the piston acting as a stop by bearing against ring 11 on the cylinder. Resistance wires 3 are fastened to insulator 19, which in turn is attached to the upper portion of the piston by cementing composition 16, and to the lower portion of cylinder 1 by cementing composition 17 and insulators 18. As shown in the drawing, these wires are kept taut when the piston is in the retracted position. The overall length of the cylindrical tube, together with the piston in is retracted position serves as the length standard during the testing period. Ring 13 constitutes a first stop and bolt 4 a second stop between which piston 2 moves.

Figure 2:
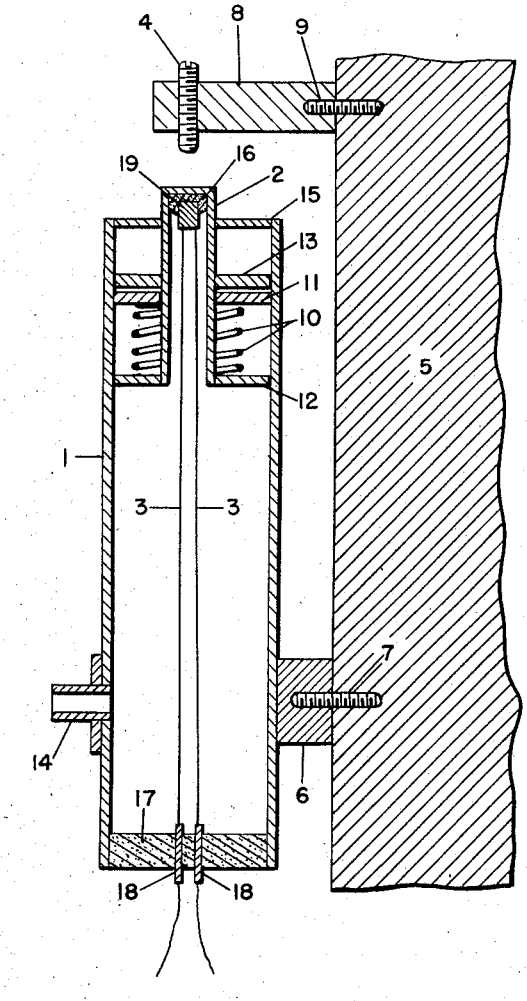
Fig. 2 is a section of Fig. 1 taken in a plane parallel to the paper, through the center of the device.

Tube 14 in the lower holder 6 is connected to test cylinder 1, as shown in Figure 2. Fluid under pressure e.g., air, is admitted thereby into the cylinder causing the piston 2 to move outwardly until it comes in contact with the bottom of bolt 4, which acts as a stop. It is obvious that the distance between the stop and piston 2 in its retracted position may be adjusted by turning threaded bolt 4 in the desired direction. Ring 15 acts as a safety stop by limiting the outward movement of the piston, thereby preventing damage to wires 3.

The outward movement of the piston causes wires 3 to undergo strain, which causes a change in the resistance of the wires. Since the strain-resistance characteristics of the wire is known, measuring the resistance by means of a bridge circuit enables the strain to be readily determined.

The gage is in standardizing position when the pressure in cylinder 1 is atmospheric. When the pressure in the cylinder is increased sufficiently above atmospheric, piston 2 is forced outwardly, against the bias of spring 10, until the end of the piston contacts stop 4. This outward movement stretches wires 3, with consequent change in resistance. The amount of elongation is then determined by measuring the resistance.

The use of this invention will be described specifically with reference to the measurement of creep of a rock core. Suitably spaced holes are drilled in the rock core 5 it is desired to investigate, and inserts 7 and 9 are cemented in place. Holders 6 and 8 are mounted on the inserts so that the former are tangent to the core. Tube 1, together with the associated piston assembly and resistance wires are then mounted in holder 6, and tube 14 is mounted in place. Stop 4 is then adjusted to give a suitable distance between the bottom of the bolt and the upper end of piston 2. This distance cannot be greater than that between rings 11 and 15. A load is applied to the core, and the strain in the wires in the standard position is determined. At suitable intervals air under pressure is admitted into cylinder 1, whereupon piston 2 contacts the bottom of stop 4. The strain in wires 3 is then determined. At each measuring interval a standardizing reading and a reading with stop 4 in contact with extended piston 2 are taken. By this method, any erroneous readings due to changes in the resistance of the wires, the bridge circuit, the insulation or lead wires, may be corrected, since the readings are compared to a standard length. By making this device out of Invar, which has a very low temperature coefficient, the necessity of running the tests at a standard temperature, or making temperature corrections may be eliminated in most cases.

The invention is not restricted to the arrangements shown, and the various details may be altered without departing from the scope of the invention. Means other than resistance wires may be employed to measure the amount of strain. There may be mechanical, inductive, capacitive, or optical devices known to the art, the important feature being that here the device may be standardized at each reading. Where resistance wires are used, one or several may be employed.

In some situations it may be desirable to have the extended piston position as the standardizing position. Also, as an alternative arrangement, the piston could be on the outside of the cylinder. A bellows or diaphragm could replace the piston if desired. Instead of air pressure to activate the piston, other fluid pressure, mechanical or magnetic means may be employed. An initial strain in the resistance wire may be provided whereby the piston is maintained in the normal retracted position.

The tube may have shapes other than cylindrical. Instead of the inserts used to attach the device to the specimen other methods may be employed, such as cementing, clamping, etc. Not only may strains due to stresses be measured by this invention, but any small movement, or the dimension of any small object may be measured thereby.

The gage may be imbedded in a solid, e.g. concrete, for creep readings. In this case, of course, the piston must be free to contact a stop likewise imbedded in the concrete.

While particular embodiments of the present invention have been disclosed and described, it is to be understood that I am not to be limited thereby, and only such limitation should be imposed as are indicated in the appended claims.

I claim:

1. A strain gage comprising an elongated member, extensible means mounted at one end of said member and adapted to extend and retract along the longitudinal axis of said elongated member, a first stop means for limiting the retractive movement of said extensible means, whereby the over-all length of the extensible means in the stopped retracted position and the elongated member constitute a reference standard, means for rigidly fastening the elongated member to a member subject to strain, a second stop means rigidly connected to said member subject to strain spaced axially from said extensible means, means for extending said extensible means so as to contact said second stop means, and means for measuring the amount of displacement of the extensible means from the first stop means to the second stop means.

2. A strain gage comprising an elongated member, extensible means mounted at one end of said member and adapted to extend and retract along the longitudinal axis of said elongated member, a first stop means for limiting the retractive movement of said extensible means, whereby the over-all length of the extensible means in the stopped retracted position and the elongated member constitute a reference standard, means for rigidly fastening the elongated member to a member subject to strain, a second stop means rigidly connected to said member subject to strain spaced axially from said extensible means, means for extending said extensible means so as to contact said second stop means, and electrical means responsive to changes of elongation fastened to said extensible means, whereby the amount of displacement of said extensible means from the first stop means to the second stop means is measured.

3. A strain gage comprising an elongated hollow member, extensible means mounted at one end of the elongated member and adapted to extend and retract along the longitudinal axis of said elongated member, a first stop means for limiting the retractive movement of said extensible means, whereby the over-all length of the extensible means in the stopped retracted position and the elongated member constitute a reference standard, means for rigidly fastening the elongated member to a member subject to strain, a second stop means rigidly connected to said member subject to strain spaced axially from said extensible means, taut electrical resistance wires bonded at one location to said extensible means, and attached at another location to the elongated member, so as to be subject to strain in response to displacement of the extensible means from the first stop means to the second stop means, and means for extending said extensible means to contact said second stop means.

4. A strain gage comprising a first elongated cylindrical member, a second cylindrical member coaxial with and slidably engaging said first cylindrical member and having a bearing end, said second cylindrical member being adapted to extend and retract along the common longitudinal axis of said cylindrical members, a first stop means for limiting the retractive movement of said extensible second cylindrical means, whereby the over-all length of the extensible second cylindrical member in the stopped retracted position and the first elongated cylindrical member constitute a reference standard, means for normally maintaining the second cylindrical member in the retracted position, means for rigidly fastening the first elongated cylindrical member to a member subject to strain, a second stop means rigidly connected to said member subject to strain spaced axially from the bearing end of said second cylindrical member, electrical means responsive to linear displacement fastened to the second cylinder, and means for extending said second cylindrical member so that its bearing end can contact the second stop means.

5. A strain gage comprising an elongated tubular member, piston means slidably mounted in said tubular member for extending and retracting movements, and having an outer bearing end, first stop means in said tubular member, engageable with shoulder means on said piston for limiting the degree of outward and inward movement of said piston means, spring means adapted to maintain said piston means in a retracted position, means for rigidly fastening said tubular member to a member subject to strain, a second stop means rigidly connected to said member subject to strain spaced axially from the bearing end of the piston means, taut electrical resistance wires bonded at one location to said piston means and held fast at another location, so as to be subject to strain in response to movement of the piston means, and means for moving the piston to contact said second stop means.

6. A strain gage comprising an elongated tubular member, piston means slidably mounted in said member for extending and retracting movement and having an outer bearing end, shoulder means on said piston adapted to contact stop means on said tubular member for limiting the retractive movement, tension means for retaining the piston in the retracted position, means for rigidly fastening said tubular member to a member subject to strain, a second stop means rigidly connected to said member subject to strain and spaced axially from said piston means, electrical means responsive to linear displacement fastened to said piston, and means for extending said piston so that its outer bearing end can contact said second stop means.

7. A strain gage comprising an elongated tubular member closed at one end, piston means slidably mounted in said tubular member for extending and retracting movement and having an outer bearing end, axially spaced outer and inner ring means on said piston means engaging the tubular member's inner surface, shoulder means on the inner surface of said tubular member, the piston means being so mounted in the tubular member that the shoulder means is located between said inner and outer ring means, whereby retraction motion of the piston means is limited by contact of the outer ring with the shoulder, compression spring means mounted between the inner ring and the shoulder, whereby the spring bias acts to maintain the piston normally in its retracted position, means for rigidly fastening said tubular member to a member subject to strain, stop means rigidly connected to said member subject to strain spaced axially from the piston means bearing end, taut electrical resistance wires located within the tubular member and bonded at one end to the piston means, and at their other end to the closed end of the tubular member, whereby said wires are subject to strain in response to movement of the piston means, means for introducing fluid under pressure into said tubular member, whereby the bearing end of said piston means is caused to contact the stop means.

References Cited in the file of this patent

UNITED STATES PATENTS

| | | |
|---|---|---|
| 1,804,596 | Dickinson | May 12, 1931 |
| 2,059,549 | Carlson | Nov. 3, 1936 |
| 2,622,176 | Baker | Dec. 16, 1952 |
| 2,790,043 | Clason | Apr. 23, 1957 |